United States Patent [19]

Peerlkamp et al.

[11] Patent Number: 4,876,301

[45] Date of Patent: Oct. 24, 1989

[54] POLYAMIDE COMPOSITION

[75] Inventors: Erik R. Peerlkamp, Born; Pieter Gijsman, Beek, both of Netherlands

[73] Assignee: Stamicarbon B.V., Geleen, Netherlands

[21] Appl. No.: 103,367

[22] Filed: Oct. 1, 1987

[30] Foreign Application Priority Data

Nov. 20, 1986 [NL] Netherlands ............... 8602947

[51] Int. Cl.$^4$ .............................................. C08K 3/22
[52] U.S. Cl. ..................................... 524/255; 524/436
[58] Field of Search ............... 524/433, 436, 424, 425, 524/602, 430, 255

[56] References Cited

U.S. PATENT DOCUMENTS

| | | | |
|---|---|---|---|
| 4,085,088 | 4/1978 | Miyata et al. | 524/436 |
| 4,131,591 | 12/1978 | MacFarlane | 524/456 |
| 4,142,031 | 2/1979 | Kato et al. | 524/433 |
| 4,446,304 | 5/1984 | Gaymans et al. | 528/335 |
| 4,699,935 | 10/1987 | Sano | 523/216 |

FOREIGN PATENT DOCUMENTS

| | | |
|---|---|---|
| 58-174440 | 10/1983 | Japan . |
| 61-085474 | 5/1986 | Japan . |
| 61-118457 | 6/1986 | Japan . |
| 61-188462 | 8/1986 | Japan . |

OTHER PUBLICATIONS

Creemers, H., "Stanyl, A New Industrial Plastic Kunstoffe Rubber", vol. 38(3), 1985, pp. 28-32.

R. J. Gaymans et al.-J. Polym. Sci. (Polym. Chem. Ed) 15, 537 (1977).

*Primary Examiner*—Veronica P. Hoke
*Attorney, Agent, or Firm*—Cushman, Darby & Cushman

[57] ABSTRACT

The invention relates to a polyamide composition with improved stability in contact with oil at elevated temperatures. The polyamide composition with superior stability characteristics has been obtained by the incorporation in the polyamide composition of a small amount of an alkaline inorganic material. Preferably the polyamide is nylon 4.6.

4 Claims, No Drawings

POLYAMIDE COMPOSITION

The invention relates to a polyamide composition with improved stability in contact with oil at elevated temperature.

Polyamides are widely used in various parts for motor cars, etc. They are used very specifically in gear wheels and other transmission elements where mechanical strength and low friction play a part. In many cases, when so used, the polyamide material, reinforced if so desired with, for instance, glass fibre, will be in contact with oils and greases. At room temperature this generally presents no problems. However, at elevated temperature, for instance higher than 60° C., particularly higher than 100° C., accelerated aging of the polyamide material takes place, causing mechanical properties like the tensile strength to deteriorate. In order to combat the decline in mechanical properties, various additives are applied in the polyamide as stabilizers. Sterically hindered phenolic compounds, aromatic amines, copper compounds and other substances are much used in this connection. Most of the stabilizer packages that are commercially available for this purpose contain one or more substances belonging to one of these categories. By combining substances sometimes a synergistic improvement of the stability can be achieved. Another possible combination is the one described in GB-A-2129814, where a combination of a condensation product of acetone with a diamine and a zeolitic material or zinc oxide gives rise to a special improvement of the heat stability.

However, in the event of a substained contact with oil at elevated temperature no satisfactory improvement of the stability is obtained with these known stabilizer combinations. If, for instance, the time in which the tensile strength falls off to 75% of the original value is taken as a measure for the stability in a test at 160° C. and with oil contact, the improvement achieved on the non-stabilized polyamide is at best only about 50%.

Consequently, the object of the invention is to find a polyamide composition showing superior stability in contact with oil at elevated temperature.

Now very surprisingly polyamide compositions with superior stability characteristics have successfully been obtained by incorporating in the polyamide composition a small amount of an alkaline inorganic material.

The polyamide composition with improved stability according to the invention is characterized in that it contains an inorganic alkaline compound(s) in an amount of 0.05-5% (wt) calculated on the polyamide.

Inorganic alkaline compound(s) are, for instance, oxides, hydroxides or compounds with an acid residue of a weak acid which contain alkali metals and/or alkali earth metals and/or metals from Group III. Compounds with other metals, too, are in principle eligible, but these are less effective and mostly coloured and therefore less attractive to be used. Preference is given to the use of compounds containing alkali earth metals, for instance calcium hydroxide, magnesium oxide, and magnesium carbonate, even more preference is given to compounds containing a metal from Group 2 as well as from Group 3, for instance magnesiumaluminiumhydroxycarbonate. The use of magnesiumaluminiumhydroxycarbonate as additive of polyolefins containing chloride residues is known, the efficiency of the compound to prevent, inter alia, corrosion of the processing equipment of the polyolefins is based on the power to bind hydrogen chloride. However, the special efficiency for polyamides in contact with oil is very unexpected.

The alkaline compound(s) is used in relatively low concentrations, for instance 0.05 to 5% (wt) calculated on the polyamide; in lower concentrations any significant positive effect on the stability is not perceptible, in concentrations higher than 5% a further improvement is only very small and the mechanical properties of the polyamide composition, such as the impact resistance, will decline. Preferably the concentration is between 0.1 and 3% (wt), the best combination of stability and mechanical properties is reached with concentrations of between 0.5 and 2% (wt). If so desired, in addition to the inorganic alkaline compound of the invention, other compounds may be present providing a further improvement of the stability, for instance antioxidants, such as copper compounds, compounds belonging to the group of hindered phenols, the aromatic amines and condensation products thereof with ketones or aldehydes or combinations thereof. Particular advantages are offered by the use of a combination containing at least one compound from the group of sterically hindered phenols and/or one compound from the group of aromatic amines or condensation products thereof with ketones or aldehydes.

The polyamides from the polyamide composition with improved stability according to the invention are especially the polyamides obtained by hydrolytic polymerization, such as the polycondensation products of lactams, for instance nylon 6, nylon 11 and nylon 12, polycondensation products of aliphatic and/or aromatic dicarboxylic acids, for instance $C_2$-$C_{12}$ aliphatic dicarboxylic acids, iso or terephthalic acid, substituted phthalic acids, etc. with aliphatic and/or aromatic diamines, for instance $C_2$-$C_{12}$ aliphatic diamines, p- or m-phenylenediamine or alkyl-substituted phenylenediamines, etc., or copolymers thereof or copolymers with ester- or imine-forming monomers, such as for instance para-butyl-terephthalate.

Preferred compositions according to the invention contain a polyamide substantially consisting of tetramethyleneadipamide units. The polyamide substantially consisting of tetramethyleneadipamide units, hereinafter referred to as nylon 4,6, may also contain other monomer components partly substituting the tetramethylenediamine or adipic acid component. The copolymer content is in principle not limited, but lower than 50%, however in practice usually not more than 30%, preferably less than 20%, is used. Copolymers may be, inter alia, amide-forming compounds, such as lactams, dicarboxylic acids and diamines, imide-forming compounds and esterforming compounds, such as ethylterephthalate and butylterephthalate. The relative viscosity of the nylon 4,6 is preferably chosen between 2.0 and 5.0, although in special cases a nylon 4,6 having a lower or higher value for the relative viscosity is permitted also.

Other components, such as colourants, pigments, flame retardants, fillers, reinforcing fibrous materials, impact modifiers, lubricants, antistatics and other polymers can be added to the composition according to the invention. Other polymers are, for instance, thermoplastic polymers, such as polystyrene, polyacrylate, polyarylate, polyolefin, other polyamides, polycarbonate and polysulphone and thermosetting resins, such as phenol resins, melamine, polyester, silicones and the like. For applications in which a high mechanical strength is desirable, preference is given to adding fibrous materials, for instance carbon fibre, glass fibre and other inorganic fibrous materials, and/or organic fibres, in an amount of 5-50% (wt) calculated on the polyamide.

The composition according to the invention can be obtained in very many ways, to which there is in principle no limitation, permitting the order of mixing and homogenization of the sundry component parts to be varied in various ways. The mixing can, for instance, be effected in the solid phase and the homogenization in the melt, or both operations in the melt, in different mixers or in one device. In another process one or more components of the composition are suspended or dissolved in a solvent and subsequently mixed with the other solid components, after that the solvent is removed from the composition by evaporation. Apparatuses or operations to be applied in this process are, for instance, blenders, kneaders, rolls and extruders.

After these operations the composition of the invention is generally obtained after extrusion in the form of granules and is used, inter alia, for the production of moulded articles by means of injection moulding and the like. It is possible also to feed a dry blended mixture of the components of the composition to the hopper of an injection moulding machine and by melt-kneading to produce moulded articles thereof directly.

The invention is further elucidated by means of the examples and comparative examples mentioned below without, however, being limited thereto.

EXAMPLE

Materials used:
Nylon 6,6: Ultramid A3 HG5 of the firm of BASF of Ludwigshafen, Germany, a stabilized trade product with c. 25% (wt) glass fibre filter.
: Maranyl AD385, of the firm of ICI of England, a stabilized type of nylon 6,6 with c. 25% (wt) glass fibres.
Nylon 4,6: STANYL of the firm of DSM of Geleen, the Netherlands, with a relative viscosity of about 3.3, unfilled and glass fibre filled, c. 30% (wt).
Anox γ: Condensation product of acetone with diphenyldiamine of the firm of Bozetto, Bergamo, Italy.
Permanax-DPPD: N,N'-diphenyl-para-phenylenediamine of the firm of Vulnax Int. Ltd., England
Irganox 1098: Phenolic compound of the firm of Ciba-Geigy, Switzerland.
KW 2200: Magnesium aluminum oxide of the firm of Kyowa, Japan.

The polyamide compositions are premixed in a dry state.

Test bars according to DIN 53504/S2 are injection moulded hereof under the injection moulding conditions customary for the relative polyamide, using an Arburg ALLrounder Type 221-55-250 injection moulding machine.

The test bars are subjected to the following aging procedure.

In separate test tubes each time one test bar is immersed in oil, Shell Spirax EP 90$^R$, at 160° C.

At different times the residual tensile strength of the various samples is determined at a drawing speed of 2.5 mm/min. Before being mechanically tested, the test bars are carefully cleaned with organic solvents for oils and fats.

In table 1-3 the results are shown obtained as the averages of five samples.

TABLE 1

| Sample | Initial tensile strength [MPa] | Stability [hours] |
| --- | --- | --- |
| Nylon 4,6 (unfilled) | 70 | <50 |
| Nylon 4,6 + 1.0% (wt) KW 2200 | 70 | 300 |
| Nylon 4,6 Glass fiber 30% (wt) | 170 | 230 |
| Nylon 4,6 Glass fiber + Anox γ 0.5% (wt) | 174 | 500 |
| Nylon 4,6 Glass fiber + Anox γ + KW 2200 1.0% (wt) | 177 | >1000 |
| Ultramid A3HG5 | 155 | 82 |
| + KW 2200 1.0% (wt) | 154 | 700 |
| Maranyl AD 385 | 161 | 62 |
| + KW 2200 1.0% (wt) | 158 | 670 |
| Nylon 6.6 (unstabilized, unfilled, $\eta_{rel} = 2.8$) | 65 | <50 |

TABLE 2

| Nylon 4.6 | + 30% (wt) Glass fiber | |
| --- | --- | --- |
| | + 1% (wt) anox γ | 172 740 |
| | + 1% (wt) MgO 135 | >1500 |
| | + 1% (wt) Ca(OH)$_2$ 155 | 1600 |
| | + 1% (wt) KW 2200 172 | 1400 |

TABLE 3

| Nylon 4.6 | + 30% (wt) Glass fiber | |
| --- | --- | --- |
| | + 0.5% (wt) Anox γ + 0.5% (wt) DPPD | 680 |
| | + 0.5% (wt) DPPD | 250 |
| | + 0.5% (wt) Anox γ + 2.0% (wt) zeolite | 760 |
| | + 0.75% (wt) Irganox 1098 | 660 |

We claim:

1. Polyamide composition with improved stability consisting substantially of tetramethylene adipamide units wherein the composition comprises magnesium-aluminum oxide in an amount of 0.05%-5% (wt) calculated on the polyamide.

2. Polyamide composition according to claim 1 wherein said composition comprises magnesium-aluminum oxide in an amount of 0.5%-2% (wt.) calculated on the polyamide.

3. Polyamide composition according to claim 2 wherein the polyamide composition additionally comprises at least one stability-improving compound chosen from the group consisting of copper compounds, sterically hindered phenolic compounds, aromatic amines or condensation products of ketones or aldehydes with aromatic amines.

4. A molded or extruded article prepared from the melt of a polyamide composition consisting substantially of tetramethylene adipamide units, wherein said polyamide composition comprises magnesium-aluminum oxide in an amount of 0.05-5% (wt.) calculated on the polyamide.

* * * * *